United States Patent
Yoon

(10) Patent No.: US 9,704,037 B2
(45) Date of Patent: Jul. 11, 2017

(54) METHOD FOR DETECTING FACE DIRECTION OF A PERSON

(71) Applicant: HYUNDAI MOTOR COMPANY, Seoul (KR)

(72) Inventor: Il Yong Yoon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 14/834,391

(22) Filed: Aug. 24, 2015

(65) Prior Publication Data

US 2016/0162735 A1    Jun. 9, 2016

(30) Foreign Application Priority Data

Dec. 8, 2014    (KR) .................. 10-2014-0175095

(51) Int. Cl.
G06K 9/00        (2006.01)
G06T 7/73        (2017.01)

(52) U.S. Cl.
CPC ............ G06K 9/00604 (2013.01); G06T 7/73 (2017.01); G06T 2207/30201 (2013.01)

(58) Field of Classification Search
CPC ...... G06T 11/005; A61B 6/032; A61B 6/4241
USPC ........................................................ 382/131
See application file for complete search history.

(56) References Cited

U.S. PATENT DOCUMENTS

| 8,457,367 | B1  | 6/2013 | Sipe et al. |
| 8,988,597 | B2* | 3/2015 | Watanabe .......... H04N 5/23219 348/227.1 |
| 2013/0222642 | A1 | 8/2013 | Watanabe |

FOREIGN PATENT DOCUMENTS

| JP | H07-057072 A | 3/1995 |
| JP | 2005-242428 A | 9/2005 |
| JP | 2005-296382 A | 10/2005 |
| JP | 2012-019931 A | 2/2012 |
| KR | 10-2013-0054830 A | 5/2013 |
| KR | 10-2013-0094939 A | 8/2013 |
| KR | 10-2013-0097671 A | 9/2013 |
| KR | 10-2014-0001164 A | 1/2014 |

\* cited by examiner

Primary Examiner — Amandeep Saini
(74) Attorney, Agent, or Firm — McDermott Will & Emery LLP

(57) ABSTRACT

A method for detecting face direction of a person includes receiving a face image of the person. The method further includes determining whether the person is wearing glasses, based on the face image. The method also includes determining whether the number of reflection points of light in a glasses region of the face image is four or more at the time of detecting the glasses region. The method also includes aligning the reflection points of light in order of size, upon determining that the number of reflection points of light is four or more. The method also includes detecting two virtual images of the light, based on the aligning. The method also includes detecting a face direction vector based on the two virtual images of the light.

8 Claims, 6 Drawing Sheets

METHOD FOR DETECTING FACE
DIRECTION OF A PERSON

CROSS-REFERENCE TO RELATED APPLICATION

This application is based on and claims the benefit of priority to Korean Patent Application No. 10-2014-0175095, filed on Dec. 8, 2014 in the Korean Intellectual Property Office, the disclosure of which is incorporated herein in its entirety by reference.

TECHNICAL FIELD

The present disclosure relates to a method for detecting face direction of a person, and more particularly, to a method for detecting face direction by estimating the person's (e.g., a vehicle driver's) line of sight through detecting a direction in which glasses worn by the person are directed.

BACKGROUND

In general, a driver surveillance system (DSM) or a line of sight tracking technique has been developed for use in advanced driver assistance systems (ADAS).

Meanwhile, although a line of sight tracking technique has been developed as an advanced driver state surveillance, several issues exist that may cause the tracking to fail. For example, if the person whose line of sight is being tracked (e.g., a driver) is wearing glasses, the glass lenses may reflect the light and consequently, the reflected light can cover the cornea reflection point in the person's eye. This can make distinguishing the cornea reflection point from the reflected light difficult. As a result, the line of sight tracking, its marketability and safety may be degraded.

SUMMARY

The present disclosure has been made to solve the above-mentioned problems occurring in the prior art while advantages achieved by the prior art are maintained intact.

An aspect of the present disclosure provides a method for detecting ace direction of a person by estimating the person's line of sight through detecting a direction in which glasses worn by the person are directed.

According to an exemplary embodiment of the present disclosure, a method for detecting face direction includes receiving a face image of a person. The method further includes determining whether the person is wearing glasses, based on the face image. The method further includes determining whether the number of reflection points of light in a glasses region of the face image is four or more at the time of detecting the glasses region. The method further includes aligning the reflection points of light in order of size, upon determining that the number of reflection points of light is four or more. The method further includes detecting two virtual images of the light, based on the aligning. The method further includes detecting a face direction vector based on the two virtual images of the light.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

Figure 1:
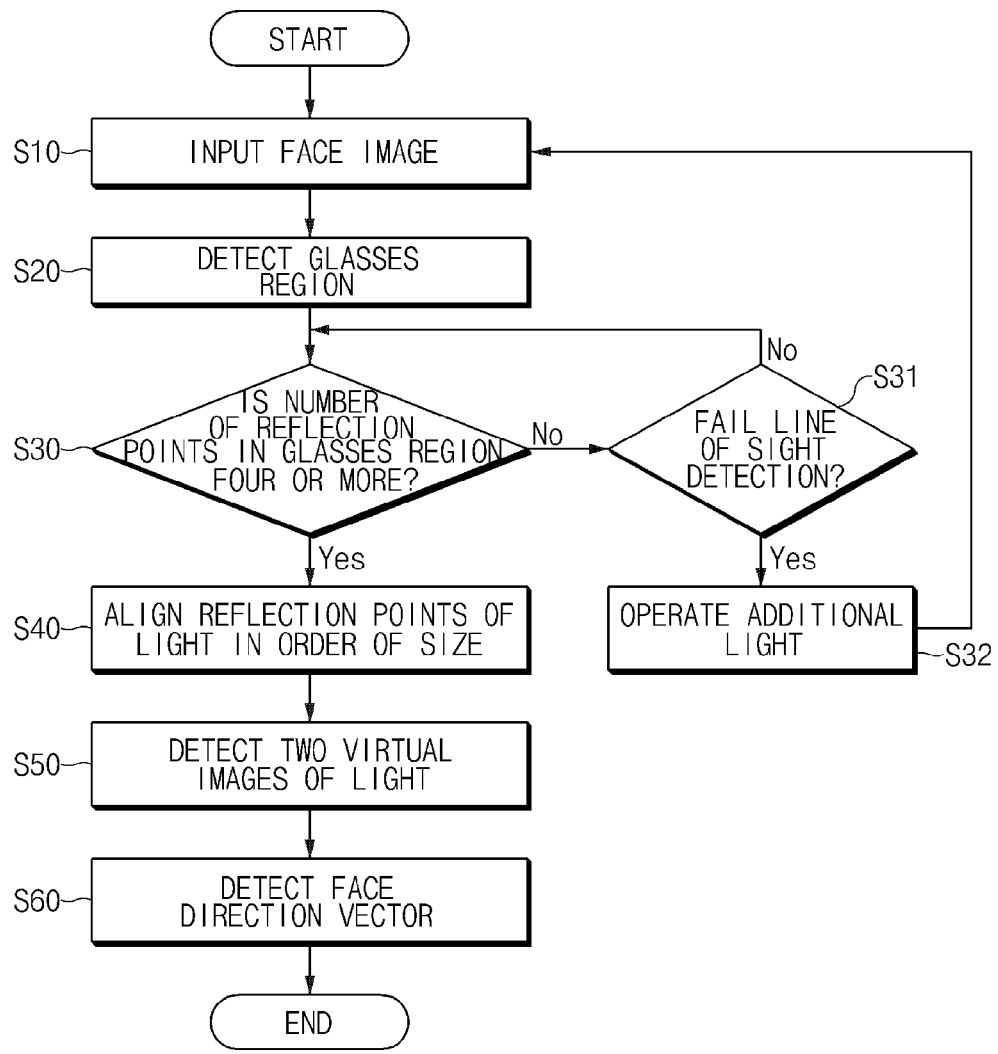
FIG. 1 is a flow chart showing a process for detecting face direction of a person according to the present disclosure.

A process for detecting face direction according to the present disclosure is shown in FIG. 1. At step S10 a face image of a person is received as input. At step S20 it is determined whether the person is wearing glasses. At step S30 reflection points of light at the glasses region is determined. At step S40 the reflection points of a light are aligned. At step S50 a virtual image of the light is detected, and at step S60 a face direction vector is detected.

As shown in FIG. 1, in step S10, which is an operation inputting the face image of a person (e.g., a driver), the face image is input through a system such as, for example, a driver state surveillance system.

At step S20, it is determined, using the face image received at step S10, whether or not the person is wearing glasses so as to enable the person's line of sight to be detected.

Upon detecting a glasses region at step S20, at step S30 it is determined whether four or more reflection points are present in the glasses region.

Figure 3:
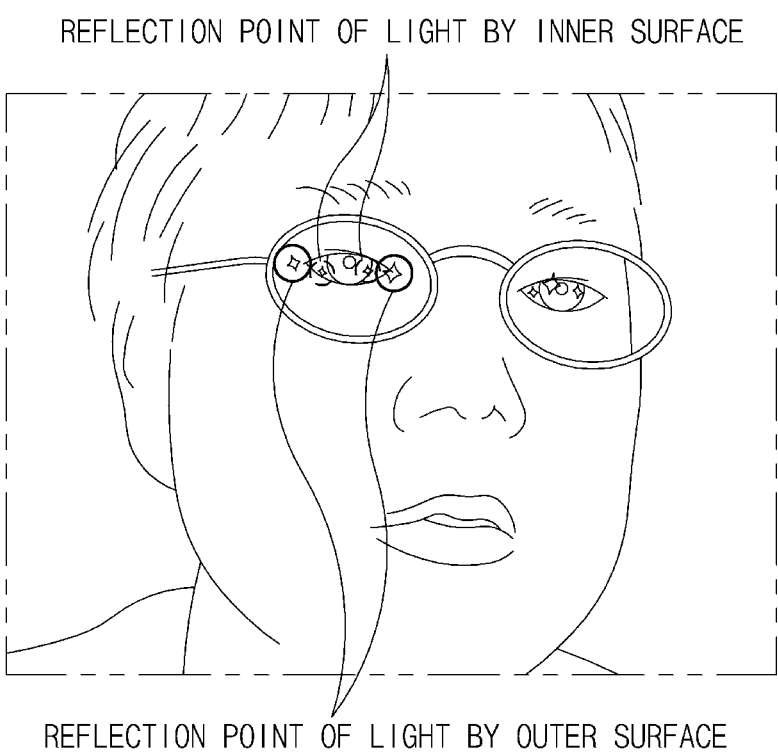
FIG. 3 is a diagram showing a classified state of reflection points of glass lenses.

As shown in FIG. 3, the reflection points in the glasses region include reflection points of light by an inner surface of the glass lenses and reflection points of light by an outer surface thereof. The light can be infrared light included in the driver state surveillance system.

Figure 2:
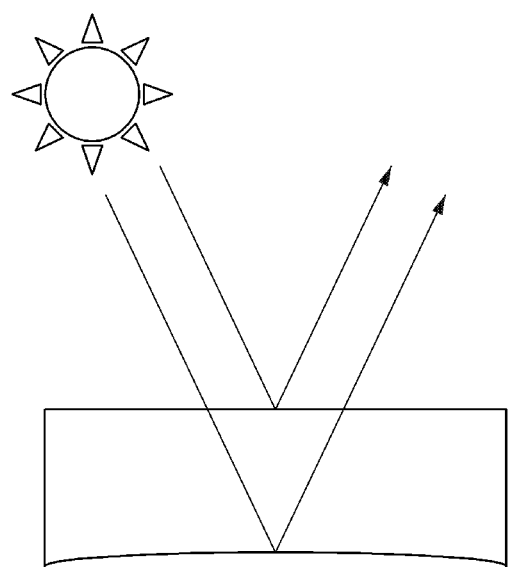
FIG. 2 is a diagram showing a double reflection by myopic glasses.

As shown in FIG. 2, a lens 201 has two reflection surfaces, wherein an outer surface 203 has a convex lens shape for both myopia and hyperopia and an inner surface 205 has a concave lens shape for myopia and a convex lens shape for hyperopia.

In the case of a myopic lens, since both surfaces of the myopic lens are convex in terms of reflection, a reduced virtual image is focused. However, since the outer lens thereof has a larger curvature radius, magnification thereof is increased and a larger image is focused on thereon.

That is, among the light reflection points, a large light reflection point is caused by the outer surface and a small light reflection point is caused by the inner surface.

In addition, since the glass lenses may not have a curvature larger than that of a cornea, the light reflection points by the glass lenses are always larger than those by the cornea.

In the case in which four reflection points of two lights by the two surfaces of the lens form an image in one lens, a straight line connecting curvature centers of the two surfaces to each other represents the face direction.

Meanwhile, in terms of lens optics, a straight line (i.e., optical axis) connecting a center of the lens and a curvature center of each surface of the lens passes through a movement center of an eyeball.

In this case, a face direction vector is calculated by the same method as a method for calculating a line of sight vector by a cornea glint.

In addition, when the glasses region is not detected at step S20, the process may continue from step S10.

In the case in which at step S30 it is determined that the number of reflection points of the glasses region is less than four, at step S31 it is determined whether the line of sight detection is failed.

In this case, when the line of sight detection is failed, at step S32 an additional light is applied so as to increase the reflection points of light.

In addition, if the addition light is applied at step S32, the process may continue from step S10 so as to input the face image by the additional light.

Figure 6:
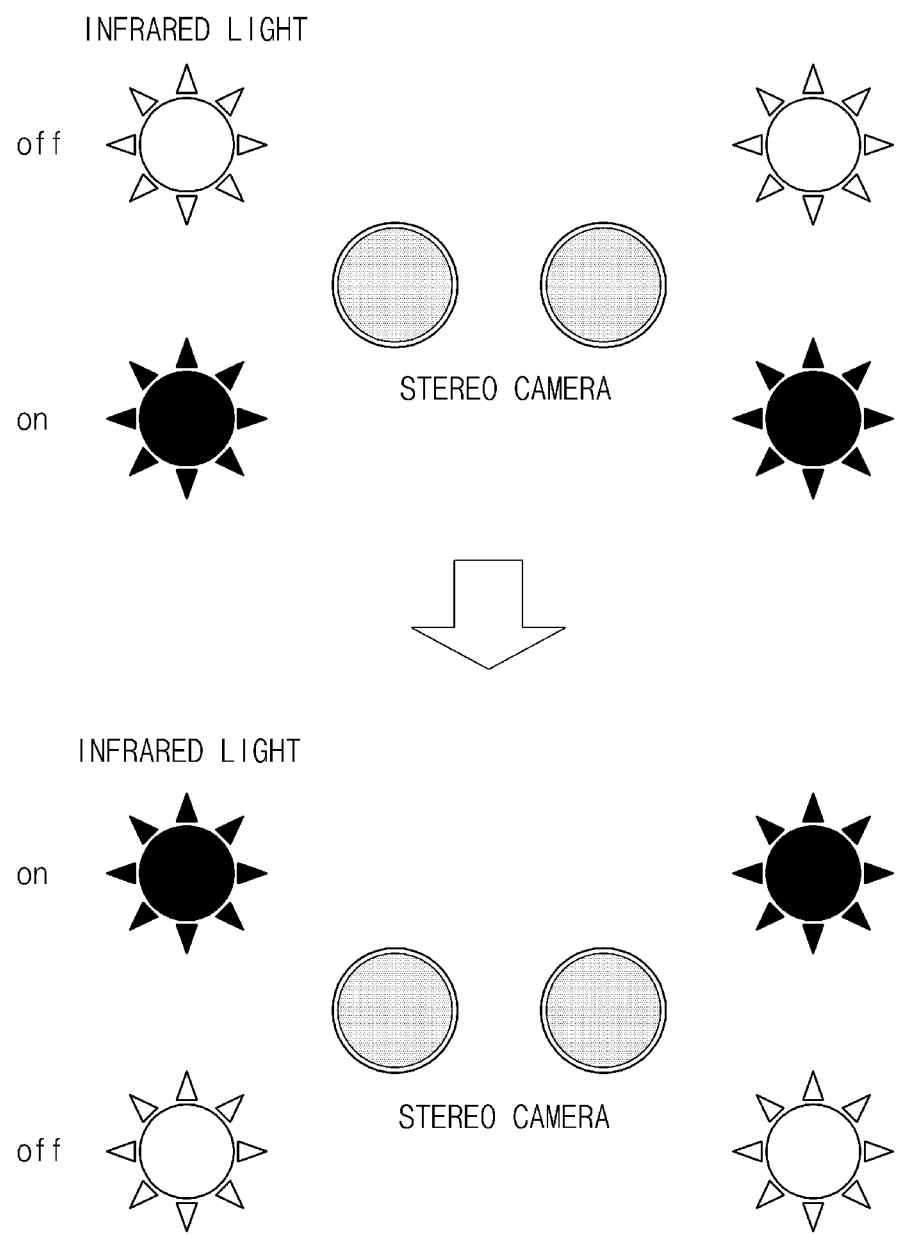
FIG. 6 is a diagram showing an example of camera and light arrangement in the process for detecting a face direction according to the present disclosure.

As shown in FIG. 6, in the case in which the number of reflection points of the light in the glass lenses is four or less and the reflection points of the cornea and a pupil may not be found, it is possible to artificially increase the reflection points of the light by applying additional light. In addition, light may be applied at different position so as to form four reflection points of the light.

Referring back to FIG. 1, in the case in which at step S31, the line of sight detection is successful, the process may continue from step S30 so as to once again determine whether the number of reflection points in the glasses region is four or more at the time of detecting the glasses region.

In this case, at step S30, the reflection points in the glasses region include a reflection point of light by an inner surface of the glass lens and a reflection point of a light by an outer surface thereof, as previously discussed with regards to FIG. 2.

When it is confirmed at step S30 that the number of reflection points in the glasses region is four or more, at step S40, the reflection points of the light are aligned in order of size.

At step S50, after the reflection points of the light are aligned at step S40, two virtual images of the light among the four reflection points of the light are detected.

At step S60, the face direction vector is detected by the two virtual images of the light detected at step S50.

Figure 4:
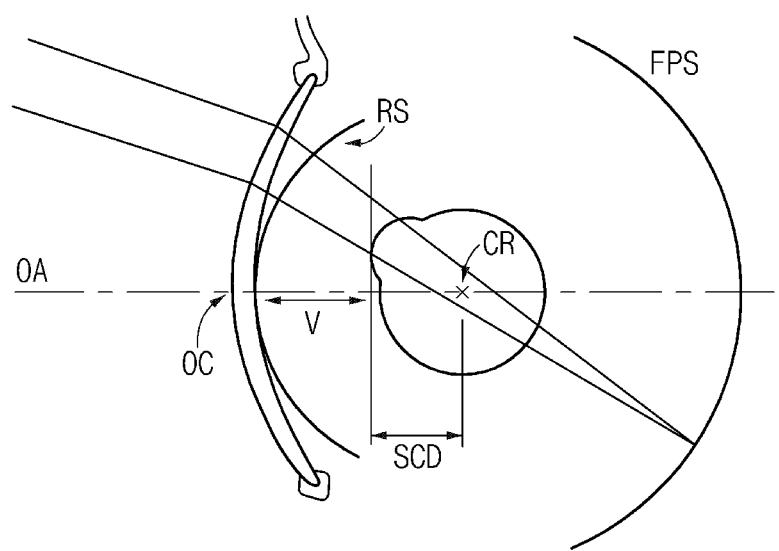
FIG. 4 is a diagram showing relationship between a center of a lens of glasses and a center of an eyeball rotation.
Figure 5:
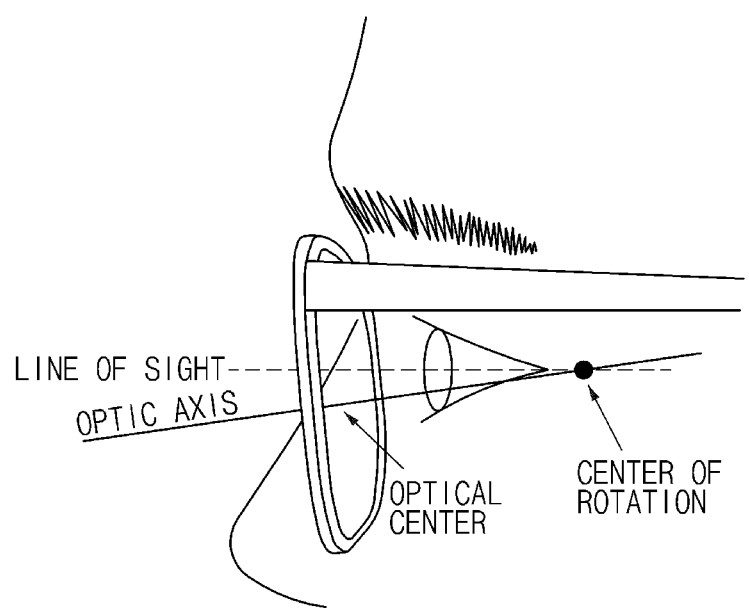
FIG. 5 is a diagram showing relationship between an optical axis due to a tilt of a frame of glasses and the center of the eyeball rotation.

As shown in FIG. 4, an optical axis (OA) of the glasses lens is designed so as to pass through the rotation center (CR) of the eyeball. In addition, as shown in FIG. 5, the glasses frame has a downward tilt of 6 to 10 degrees. However even in this case, the pass of the optical axis through the lens is effective.

As described above, the method for detecting face direction of a person according to the present disclosure provides face direction in which the glasses view becomes the face direction by reversely using the reflection points of the light by the glass lenses. Consequently, marketability and safety may be increased by detecting the direction in which the glass lenses view so as to improve probability of the person's line of sight estimation.

In the case in which the number of reflection points of the light is four in the glass lens, the line of sight detection or the reflection point detection of the cornea have failed in most cases in the past. However, according to the present disclosure, the face direction vector is detected so as to be used for increasing accuracy in estimating the failed line of sight and a distraction monitoring may be performed by just a change in a face direction. As a result, it is possible to cope with an emergency situation even in the case in which the line of sight detection is failed.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A method for detecting face direction, the method comprising:
   receiving a face image of a person;
   determining whether the person is wearing glasses, based on the face image;
   determining whether a number of reflection points of light in a glasses region of the face image is four or more at a time of detecting the glasses region;
   aligning reflection points of light in order of size, upon determining that the number of reflection points of light is four or more;
   detecting two virtual images of the light, based on the aligning; and
   detecting a face direction vector based on the two virtual images of the light.

2. The method according to claim 1, wherein determining whether the person is wearing glasses comprises detecting a glasses region in the face image, and
   when the glasses region is not detected, receiving a second face image of the person.

3. The method according to claim 1, further comprising:
   upon determining that the number of reflection points of light in the glasses is less than four, detecting a line of sight of the person.

4. The method according to claim 3, further comprising:
   determining a failure of the line of sight detection; and
   applying additional light so as to increase the reflection points of the light.

5. The method according to claim 4, further comprising:
   upon applying the additional light, receiving a third face image of the person.

6. The method according to claim 3, further comprising:
   determining a success of the line of sight detection; and
   determining whether the number of reflection points of light in the glasses region of the face image is four or more at the time of detecting the glasses region.

7. The method according to claim 1, wherein the reflection points are reflection points of light by an inner surface of a lens of the glasses and reflection points of light by an outer surface thereof.

8. The method according to claim 1, wherein the face image is received through a driver state surveillance system.

* * * * *